(12) United States Patent
Freeman

(10) Patent No.: US 8,851,560 B1
(45) Date of Patent: Oct. 7, 2014

(54) MULTILEVEL VEHICLE ROOF SUPPORTING A DEPLOYABLE SOLAR ARRAY

(71) Applicant: Benjamin David Freeman, Newtown Sq., PA (US)

(72) Inventor: Benjamin David Freeman, Newtown Sq., PA (US)

( * ) Notice: Subject to any disclaimer, the term of this patent is extended or adjusted under 35 U.S.C. 154(b) by 0 days.

(21) Appl. No.: 13/887,504

(22) Filed: May 6, 2013

(51) Int. Cl.
| | |
|---|---|
| *B60J 7/00* | (2006.01) |
| *B60L 8/00* | (2006.01) |
| *B60K 16/00* | (2006.01) |
| *B60L 3/00* | (2006.01) |
| *B60J 7/08* | (2006.01) |

(52) U.S. Cl.
CPC ................. *B60K 16/00* (2013.01); *B60L 8/003* (2013.01); *B60L 3/00* (2013.01); *B60J 7/08* (2013.01)
USPC ............................................ 296/210; 180/2.2

(58) Field of Classification Search
USPC ............ 296/210; 180/2.2, 65.1, 65.31, 65.51; 136/244; 60/641.1, 641.8
See application file for complete search history.

(56) References Cited

U.S. PATENT DOCUMENTS

| | | | | |
|---|---|---|---|---|
| 4,592,436 A | * | 6/1986 | Tomei | 180/2.2 |
| 5,680,907 A | * | 10/1997 | Weihe | 180/2.2 |
| 5,725,062 A | * | 3/1998 | Fronek | 180/2.2 |
| 7,445,064 B2 | * | 11/2008 | Kim | 180/2.2 |
| 7,493,974 B1 | * | 2/2009 | Boncodin | 180/2.2 |
| 8,141,666 B2 | * | 3/2012 | Ganiere | 180/2.2 |
| 2008/0202825 A1 | * | 8/2008 | Kerish | 180/2.2 |
| 2009/0288890 A1 | * | 11/2009 | Freeman | 180/2.2 |
| 2009/0288891 A1 | * | 11/2009 | Budge | 180/2.2 |
| 2010/0000804 A1 | * | 1/2010 | Yeh | 180/2.2 |
| 2010/0018785 A1 | * | 1/2010 | Samuel | 180/2.2 |
| 2010/0089433 A1 | * | 4/2010 | Conger | 136/244 |
| 2010/0193260 A1 | * | 8/2010 | Freeman | 180/2.2 |
| 2010/0193261 A1 | * | 8/2010 | Freeman | 180/2.2 |
| 2010/0193262 A1 | * | 8/2010 | Zhao | 180/2.2 |
| 2012/0043143 A1 | * | 2/2012 | Hui et al. | 180/2.2 |
| 2012/0073885 A1 | * | 3/2012 | Glynn | 180/2.2 |
| 2013/0000994 A1 | * | 1/2013 | Zhu | 180/2.2 |
| 2013/0092457 A1 | * | 4/2013 | Wecker et al. | 180/2.2 |

FOREIGN PATENT DOCUMENTS

WO    WO 2009142650 A1 * 11/2009

\* cited by examiner

*Primary Examiner* — Lori Lyjak

(57) ABSTRACT

The device is a vehicle with a carefully designed multi-layered roof and with a solar array consisting of at least five solar panels mounted on various parts of that roof. When the vehicle is being driven none of the solar panels will extend beyond the outer perimeter of the vehicle. When the vehicle is parked, the driver will be able to cause the at least four solar panels to be repositioned in such a way that their total footprint is more than twice the total footprint of the vehicle. This vehicle will also feature an onboard computer that can help the driver do a variety of tasks that are not normally necessary for typical vehicles and which involve levels of information processing which a normal person would be better off allowing the onboard computer to accomplish.

22 Claims, 18 Drawing Sheets

MULTILEVEL VEHICLE ROOF SUPPORTING A DEPLOYABLE SOLAR ARRAY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The problem the present invention was created to solve is the range limitation of electric vehicles. As many corporate automobile engineers and an army of independent inventors and thinkers have realized, increasing the range of an electric car with a solar array could give electric cars the range they need to compete on an equal footing with gas driven cars. But no one has yet sold a solar car, truck or van commercially. I believe that this is because the following somewhat contradictory objectives must also be met to make a solar car as attractive to potential buyers as another type of vehicle:

A The total amount of electricity created by the solar array must be enough that it can provide most of the energy which an average driver uses. In general, this requires a solar array with a much larger average footprint than the footpring of the vehicle the solar panels are mounted on. However, the dimensions of the deployed solar array must not be so large that it goes beyond the area which is normally allotted for one cars usage.

B The solar array must not cause the vehicle to become unstable, to do a wheelie, to tip over or to take off like an airplane This requires that the solar cells that extend beyond the perimeter of the vehicle when it is being driven be minimized.

C. the vehicle must be as intrinsically safe as a standard car, truck, bus or van of a similar type. This includes such factors as minimizing glare, making it possible to turn the vehicle easily and for the driver to see outside D. The solar array must not make it difficult for the driver and passengers to enter or leave the vehicle and it must not make it easy for solar cells to be vandalized or hit by stray dirt. The solar array must also not be positioned in such a way that passersby or others could easily get hurt or damage it by running into it. Additionally, the solar array must not interfere with the driver's vision or make passengers feel claustrophobic by not allowing them to see out of the vehicle E. Over the lifetime of a typical car, truck, bus or van, the cost of the solar array and any mechanisms needed to support it must not be so expensive that they are significantly greater than the fuel savings created by switching to solar electricity from gasoline. Furthermore, the systems used must be reliable F. The solar array must be high enough when it is producing electricity that it will not be shaded by people, nearby vehicles and other objects of similar or lesser heights. It also must be designed in such a way that one part of the solar array does not shade another part for more than a small minority of the day.

G. The solar array must not interfere with the vehicles ability to perform as a standard car, minivan or similar vehicle in terms of parking, handling passenger comfort and other practical issues.

H. It must be possible to align or orient the solar array towards the sun for maximal electricity output.

While point A leads one to design a very large solar array, a very large array mounted high enough to allow for egress and to avoid other problems cited above would create stability problems while driving and interfere with fulfilling point B. But solar panels that extended beyond the front area of vehicle perimeter and were mounted much lower would create egress problems, glare on the driver, be easily shaded by nearby objects including the roof and roof array of the vehicle and be subject to vandalism. Just as driving and turning a large truck or bus is harder than driving a small car, any vehicle would be more difficult to drive if it had an array that extended significantly beyond its outside perimeter.

The key to understanding how to achieve the somewhat contradictory objectives A-H listed above is to have an array whose constituent parts (i.e., solar panels) do not extend significantly beyond the vehicles perimeter when it is being driven—but these solar panels can be repositioned when the vehicle is parked so that the total footprint of the solar array covers an area much larger than the vehicle. Since people typically park a vehicle far more than they drive it, an expandable solar array could increase the range of an electric car enough to fulfill an average driver's needs.

In the present invention, I use the word "undeployed" to describe the solar array when it's individual solar panels are stacked up on top of the carefully designed vehicle roof without going beyond its perimeter. When the vehicle is parked, however, the solar array can be expanded to cover an area approximately equal to the size of a standard parking space. This repositioned solar array which covers a footpring far larger than the vehicle itself is called expanded. And once each of the solar panels which make up the array are moved to the same level after the solar array is expanded, I call the solar array "deployed."

With this in mind, let us examine the prior art to see what people have thought of in the past:

PRIOR ART

The solar cars that win off-road races are barely big enough for the driver to get inside. They typically have fixed sixed solar arrays that are more than four times as large as the small vehicle cabin. Since few people will buy and use a vehicle that can fit no passengers or cargo, putting a fixed size solar array that is four or more times as large as a vehicle on a more typically sized vehicle would make it too large to be driven on regular roads without hitting other vehicles. To avoid aerodynamic problems, the solar racing cars typically place their arrays below the height of a normal sized person. Someone using such a vehicle once in a while for racing purposes might not mind ducking down to enter their vehicle. But no regular consumer would be willing to put up with the inconvenience of ducking down every time they left or entered their vehicle. However, placing a huge overhanging array high enough to allow the driver or passengers to enter without ducking is dangerous. It might cause the vehicle to take off like an airplane. In fact, a solar test vehicle I built with a huge and high overhanging array flipped over due to a momentary wind gust while I was transporting it in an open truck at twenty miles per hour. Partly for this reason, I ended up abandoning an earlier patent application of mine (Freeman 20100193261) because I myself also almost flipped over due to a momentary wind gust when riding such a vehicle. Even if a vehicle with a truly large overhanging solar array more than six feet above the ground doesn't flip over or take off like an airplane, this type of solar vehicle can become dangerous to drive in windy weather. From my own experience, I can tell you that driving a solar vehicle with an overhanging solar array that is more than thirty percent larger than the vehicle creates a much worse version of the problems one encounters when driving an RV in very windy weather. What actually happens is that the vehicle is pushed around by windy weather so badly that safety and vehicle control are compromised.

To avoid the problems of an overhanging array, many previous patents, patent applications and users have involved vehicles with solar panels that do not extend beyond the vehicle perimeter. I will use Ward's U.S. Pat. No. 8,120,308 BC to illustrate this point. While this patent has a variety of useful and interesting ideas, it specifically talks about solar panels "being mounted on the vehicle, or provided inside the vehicle beneath a mirror. Examples of surface where a solar panel can be provided include a roof, trunk, moon roof and a pick up truck bed.cover. Other modular panels include solar panels provided on sunshades, roof rail attachments or roof top clamps on carriers." Like most other uses, patents and patent applications, it is clear that this invention only contemplates using a solar array of a fixed size with panels mounted on the available vehicle surface area. But as I mentioned in my "background" section, the limited area available on a vehicle makes a solar array limited in size to the roof, hood and other normal areas unable to supply nearly enough electricity to provide most or all of the power required by a typical driver. It is well known, for instance, that Toyota has experimented with putting solar panels on some of its vehicles with electric motors. This auto behemoth found that the extra range created does not justify the complexity and problems associated with adding a solar component to help fuel the main battery system. Therefore, Toyota only currently sells a vehicle with the very small roof solar panel powering only part of the cooling system and not connected to the main battery system of the drive system.

In one of my earlier abandoned applications, (Freeman 20090288890) I tried to use the idea of repositioning solar panels without actually expanding the size of the solar array. Instead of getting the best of both worlds, I ended up creating something which is deficient on both ends. Firstly, when a vehicle built in accordance with that invention is driven it will still not fully fulfill the objectives listed in the background section partly because some solar panels will be positioned outside the perimeter of the vehicle. But in my attempt to minimize the area of the array which was positioned beyond the outside perimeter of the vehicle, I ended up making the expanded solar array smaller than required to fully power a vehicle with a motor as large as most electric vehicles on the road today. From my own attempts and from consideration of a few others who have thought along those lines, I think I can generally say that this halfway approach is not viable. One needs to start with an array that does not hang a significant distance beyond the vehicle perimeter when driving and expand its total footprint by a factor of at least two to have any chance of fulfilling the key first objective of enough solar electricity production without running afoul of the other objectives listed.

With this in mind, the same inventor (Ward in C2008/0100258) I mentioned before is one of the few who does suggest the possibility of extending a solar panel in a straight line parallel with one of the four sides of the vehicle. If one looks carefully at his claims, specifications and drawings, he is not even suggesting the expansion of the total area of the solar array to a footprint larger than the vehicle. Furthermore, there are inherent difficulties associated with only moving solar panels in a line which is parallel to either the side of the vehicle or parallel to the front or rear of the vehicle. The main problem is that one does not easily create the type of larger rectangular shape which conforms to parking spaces or areas traditionally assigned to one vehicle by moving solar panels only in either or both or both of the directions Ward proposes in this patent. Even if one made the conceptual leaps of radically increasing the size of the panels and of combining both directional movements which Ward suggests, one would find that it is almost impossible without very expensive mechanisms or without having some of the mechanisms located outside the perimeter of the area originally occupied by the solar array in the undeployed position. For that reason, the eleven movements I propose among the three embodiments of the present invention only include one very limited case of moving solar panels forwards and then sideways in two different motions. And the way I can use mechanisms located beyond the undeployed solar array area is that I use the most expensive group of devices of my three embodiments and locate most of them in the front hood area to move some solar panels whose nearest undeployed point is a few feet behind over the drivers seat area.

In addition to repeating the same movement possibilities suggested by Ward, Glynn (US 2012/0073885) also proposes that a stack of solar panels be connected by a rod or two and that they rotate around that rod. Even if one tried to expand either Glynn's idea to a much larger size than he seems to be proposing, the end result would not be a rectangular shaped deployed array. This would either reduce the amount of electricity generated due to the parts of the rectangle not covered by solar cells or it would require that some edges of the deployed solar array go far beyond the area of a parking space or the area traditionally assigned to a vehicle in other contexts. Even if one ignores the legal, PR or vandalism problems and the increased possibility that a passerby may inadvertently hit the corner of an array if it extends further beyond the edge of the vehicle, there is a more serious issue. The longer the furthest point of the array is from the vehicle perimeter, the more expensive and problematical the system becomes. Besides the other problems this would create, a solar array that has even one panel hanging significantly beyond a parking space could easily create an accident with a moving truck, RV or high van. If one of these vehicles with a high roof was driving in its legally allowed driving lane, it could easily run into the edge of a solar array which was far beyond the end of the legal parking space of the vehicle it was attached to.

From having tried out hundreds of different panel movements, I realize that the general idea of moving solar panels is only a rough beginning. For reasons explained in the background section, an optimal solution requires the movement of the panels to expand the total solar array from an area generally within the perimeter of a vehicle to an area which generally conforms to a parking space that is about eleven feet wide by about twenty two feet long. But even figuring out how to expand the array until it is as large as a parking space is to maximize solar electricity generation, is not enough on its own to solve the problem. One has to be careful, for instance, about what is happening when the array is undeployed. For instance, it is very possible to flip out solar panels to create a huge deployed array in such a way that the array produces no electricity at all when the vehicle is driven (as I myself did in a second embodiment of an earlier abandoned application;

Freeman 20100193261). While the type of panel movement is important, even the ones I propose in the present invention are problematical when trying to increase the array size by any factor larger than two unless one adds another idea. The underlying reason that the present invention comes up with the idea of a vehicle roof with internal overhangs is that any alternative way to create a really huge array involves stacking up so many panels that handling their movements requires an overly expensive, overly robust and overly problematical system of actuators and other mechanisms. Additionally, a stack of more than four or five solar panels over a standard roof would end up creating a total extra height (including mechanisms) of over two feet. If one uses a stack of about ten solar panels (as Glynn suggests in a variation of his most promising possibility that could actually create a huge total deployed solar array as large as a parking space), then the height of the undeployed stack along with the mechanisms to realistically manipulate it would be about four to five feet above the vehicle roof. Even besides the aesthetic issues associated with such an ungainly array, such a high stack would end up being somewhat unreliable given that vehicles drive at highway speeds in windy conditions. The only way to make such a high array hard to shake when driving would be to use such robust versions of the mechanisms needed that their cost would be a huge percentage of the total vehicle price.

Furthermore, there is no patent or use which suggests the key oblique and fully rotational (ninety degree) movements which are featured in the present invention. I feature these two movements because they create the largest possible array with the lowest mechanism cost and with the most reduced added height of the panels and their mechanisms. In my opinion, the bottom line is that careful consideration of all of the other patents, patent applications and actual uses demonstrate that they haven't considered what type of actual panel geometries, sizes and movement make sense in terms of the geometry of vehicles, cost, reliability and of the area normally allotted to vehicles for parking.

It is also important to make it possible to tilt the array towards the sun because this can make as much as a forty percent difference in electricity generation. Although many people have used formal two axis trackers with stationary solar arrays, most patents, actual uses and patent applications involving vehicles have ignored this key point. As you will see, I believe that there is an easier way to create the same basic effect with a motorized vehicle. Not only will my system (which, in one limited small scale case, involves a one axis tilting mechanism) cost less than a traditional two axis tracker for an entire array, but simulating the problems involved with using a two axis tracker to manipulate an entire large array indicates that the two axis tracker system is far more problematical on a moving vehicle than it is when applied to a stationary array. Just as a two axis tracker isn't the optimal system for a vehicle, neither are the other systems suggested for stationary arrays really designed to work with a moving vehicle. Not only does mounting a system on a vehicle have to consider stability problems which aren't applicable to a stationary array, but one can use the drivers ability to determine how to park the vehicle to reduce the complexity of a system in a way which doesn't make sense for a stationary array.

BRIEF SUMMARY OF THE PRESENT INVENTION

As the reader will understand better once one looks at figure one, the first key point of the present invention is that the present invention contemplates internal overhangs in the vehicle roof to allow us to position more square footage of solar panels on the vehicle roof than would be possible if it were a normal roof without any internal overhangs. In the first of the three embodiments described in the detailed description, this will result in one set of solar panels extending the total length of the lower roof surface and another set of solar panels extending the whole length of the vehicle in the higher roof surface. Not only can the solar panels mounted on the higher roof surface cover some of the area of the lower roof because of the ability of both sets of panels to sit on a vehicle roof which sits above the same ground, but the fact that one set of solar panels are on a higher level means that they can even extend over the other solar panels where there is no roof surface for them to sit directly on top of. Hence, there will be at least two groups of solar panels in the present invention. Just as there will be at least two sets of solar panels with one on a higher roof surface than the other one, there will be two solar panels in each of these first two sets of solar panels with one sitting on a higher level than the other one. How can this be done?

There will be a stationary shelf covering one side of each roof surface. These shelves will be half the width of the vehicle and be just high enough above the roof surface that a solar panel and two mechanisms to move it and stabilize it will be able to fit in the area between the roof surface and the stationary shelf. While one of each set of solar panels will rest on the roof surface in the undeployed position, the other member of each set of solar panels will rest on the stationary shelf.

Each of these four solar panels (two on each roof surface and one of each set of two on a stationary shelf) will move at an oblique angle towards their deployed position. The final deployed result for the first embodiment listed in the detailed description and in the first six drawings will be that the two solar panels on the top roof surface will still cover that roof surface but also cover an area in front of the top roof surface equal to the area that they covered over the lower set of solar panels (not counting the roof overlap area). In addition to causing the set of two solar panels on the higher roof surface to move forwards, this oblique movement will also result in these two solar panels sitting next to each other (rather than on top of each other as they sit in the undeployed position). In effect, their differently angled oblique movements will cause one of them to cover the right half of the vehicle plus an equal area to the right side of the vehicle and cause the other solar panel in this set to cover the left half of the front of the vehicle and an equally wide area to its left. Just as the oblique movement of the top two solar panels will cause them to simultaneously move sideways and forwards, the oblique movement of the bottom two solar panels will cause them to simultaneously move backwards and sideways. The final result for an average sized crossover or minivan type vehicle is that a solar array which only covers the vehicle roof in the undeployed position will cover a typical parking space in the deployed position.

In other embodiments of the present invention, there also might be a rectangular solar panel which will be rotated from a position where its long edge is parallel to the long edge of the vehicle to a position where its long edge is perpendicular to the long edge of the vehicle. In general, these rotating solar panels will be positioned between the front set of two solar panels and the rear set of two solar panels. While other movement systems might also be possible under the terms of the present invention, the bottom line is that any use of the movement system contemplated in the present invention will expand an undeployed solar array from an area that is generally less than the footprint of the vehicle to one that is far larger than the footprint of the vehicle. By tilting some of the roof surfaces and using a titling mechanism to manipulate solar panels that are not sitting on tilted roof surfaces or tilted stationary shelves, the present invention also contemplates creating a fully deployed solar array where all solar panels are on the same plane and this plane is tilted with respect to the ground.

Additionally, the present invention also contemplates a linking mechanism between deployed solar panels and a system for making sure that all solar cells will produce electricity whenever they are exposed to direct sunlight.

Since there is nothing truly new under the sun and thousands of individuals (including teams of engineers from major car companies) have been trying to create a solar car and other solar power systems to avoid the need to rely on fossil fuels, people have come up with a variety of ideas which could be combined in ways they weren't meant to be combined to roughly parallel what the present invention proposes. After reading any patent application and knowing what the inventor did, one can always make a tortuous argument that a person of average skill could make the imaginative leaps required to combine many features from different inventions and devices to create the end result of any particular patent application. But in this case, we are dealing with an issue (solar cars and solar mechanisms) which myriad creative individuals and teams of highly paid experienced engineers have been working on for at least a decade. If it were so obvious how to combine these features to create a vehicle that fulfills all of the potentially contradictory objectives A-H listed in the background section, why didn't someone do it before me in this present application? Furthermore, the fact that this particular combination of features creates the unexpected result that it opens a realistic avenue to replace gas cars and, thereby, mitigate global warming and prevent a future oil war means that the present invention creates an unexpected and incredibly useful and important result as outlined in the patent law.

Before we move on to the sections involving the drawings, detailed description and the claims, it is necessary and useful for me to define various terms used in this patent application.

Along with their framework, the solar cells which generate electricity together and move together are called solar panels. But within that general definition, there can be many variations. For instance, one could use thin or thicker cells and one could place the solar cells on various substrates.

Just as the form and area of a solar panel can vary, so can the type of solar cell vary. Monocrystalline silicon, polycrystalline silicon, amorphous silicon, cadmium telluride, copper indium sulfide can all be used. Many currently available solar cells of these types are made from bulk materials that are cut into wafers between 180 to 240 micrometers thick that are then processed like other semiconductors. But a promising new avenue is called thin film. Other types of organic dyes and polymers deposited on various supporting substrates have also been employed to convert solar energy into electricity. Nano-crystals and quantum dots (which are usually electron-confined nonoparticles) have also been employed to create solar generated electricity. Since the key to the present invention involves movement of groups of solar cells together from one position to another one, any type of solar cell can be used as long as they can be placed on some sort of substrate or within some sort of framework which can be moved around from one position to another one.

The differentiation between solar cells and solar panels is that the solar cells are the parts of the solar panel that actually convert solar energy into electricity. Other parts of the solar panel may include its framework. However, I also use the label "framework extension" to apply to something which is not necessary to hold the solar panel together but which is affixed to the edge of a solar panel's framework. They only are included on either the top or bottom of a framework.

For purposes of this invention, oblique is defined as a direction of movement for a horizontal actuator or of a solar panel which is straight but at least ten degrees different from both the sides and the front or back of the vehicle upon which it is mounted. What this means related to the claims is that the direction of travel of both the horizontal actuators and the solar panels will be at an angle between ten and eighty degrees assuming that a straight line along the axis is considered zero degrees. While actuators are defined as the mechanism that moves using pneumatic, electrical, hydraulic or other similar forms of power type systems, the present invention also can include telescoping tracks which generally move alongside horizontally oriented actuators. They are differentiated from actuators primarily because they are pulled by either an actuator directly or, more generally, by a solar panel which itself is moved by an actuator.

For purposes of this invention, the words "vertical actuator" is used to describe any mechanism whose purpose is to move a solar panel in a direction which is closer to upwards or downwards than to horizontal. Horizontal actuators, on the other hand, are mechanisms whose purpose is to move solar panels in a direction that is closer to horizontal than to vertical.

The present invention also uses the term "rotating actuator." This refers to an actuator that rotates a solar panel as opposed to horizontal and vertical actuators which move solar panels in one straight direction as discussed in the previous paragraphs.

As I have already pointed out, I often use the word undeployed in the present invention. It applies to a solar array wherein at least eighty percent of all the solar cells are within the outside perimeter of the vehicle. When the solar panels have been repositioned where more than twenty percent of the total solar cells are beyond the outside perimeter of the vehicle with respect to the ground I either use the word expanded or the word deployed. The difference between expanded and fully deployed is that only the fully deployed solar array places all solar panels on the same plane (however, this plane usually is tilted with respect to the ground meaning that one side is higher than the other one).

For purposes of the present invention, a roof includes everything that is normally considered a vehicle roof plus any other structure that is higher than the lowest point of the ceiling of the occupant area which allows outside air to enter it. This would include a shelf which is not fully protected from wind and outside air and is more than forty eight inches above the ground.

BRIEF DESCRIPTION OF THE SEVERAL
VIEWS OF THE DRAWINGS

Figure 1:
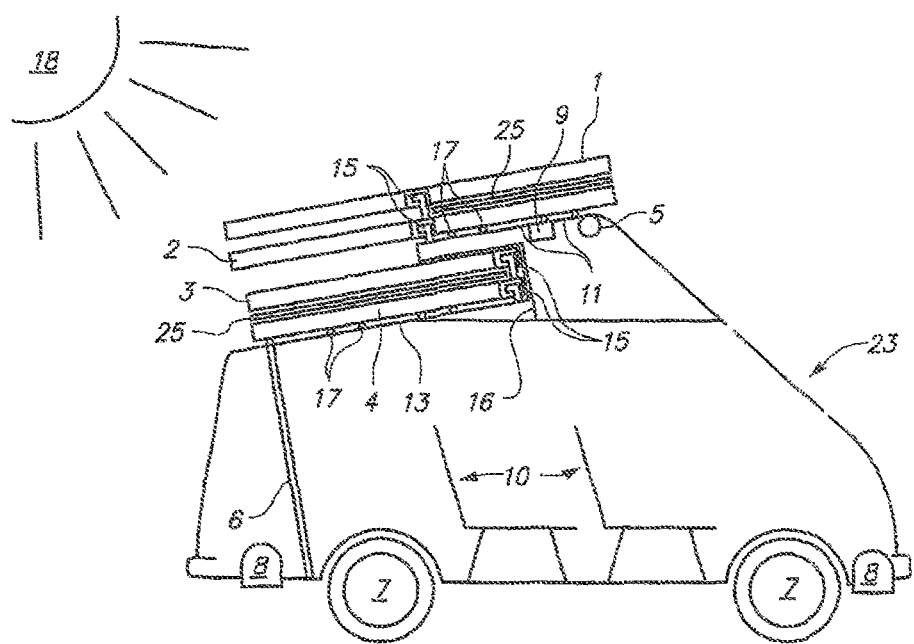
FIG. 1 Is a side view of the vehicle 2 and its roof with the solar array undeployed.
Figure 2:
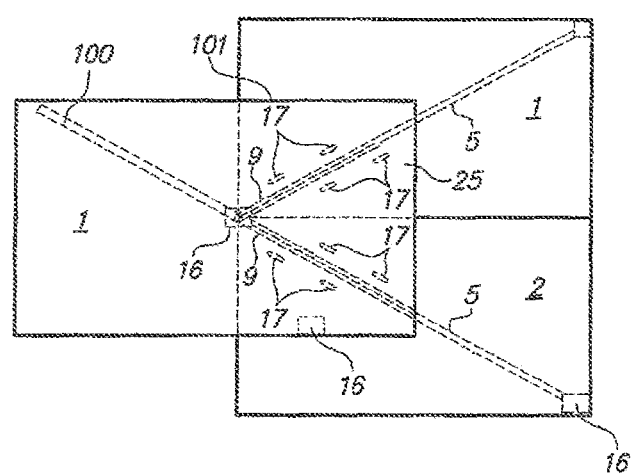
FIG. 2 is a top view of the two solar panels and related mechanisms which are positioned in the front of the vehicle.
Figure 3:
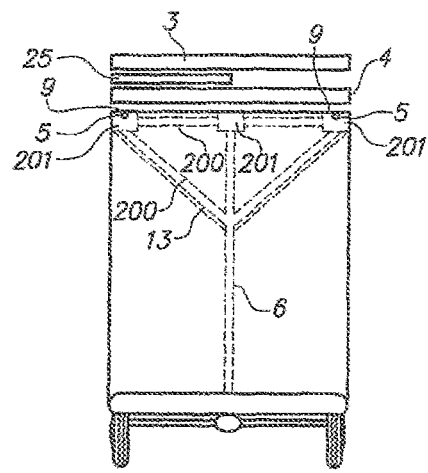

FIG. 3: Is a rear view of the vehicle to help us understand how the rear two solar panels will be deployed.

Figure 4:
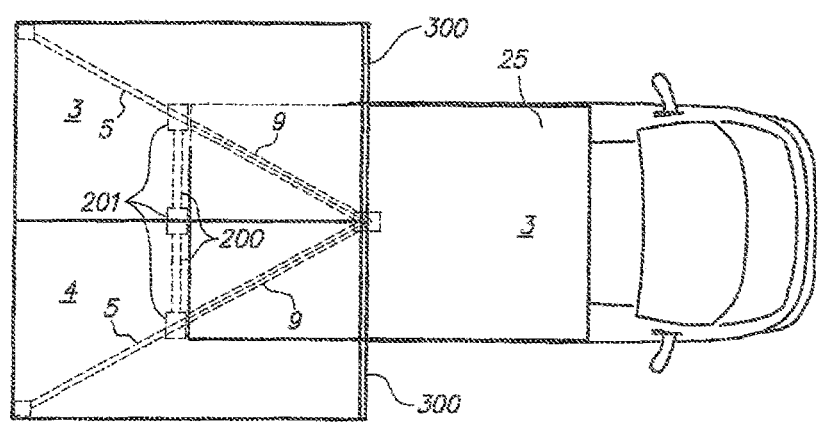

FIG. 4: Is a top view of the two solar panels at the back of the vehicle to also help us understand how they will be deployed.

Figure 5:
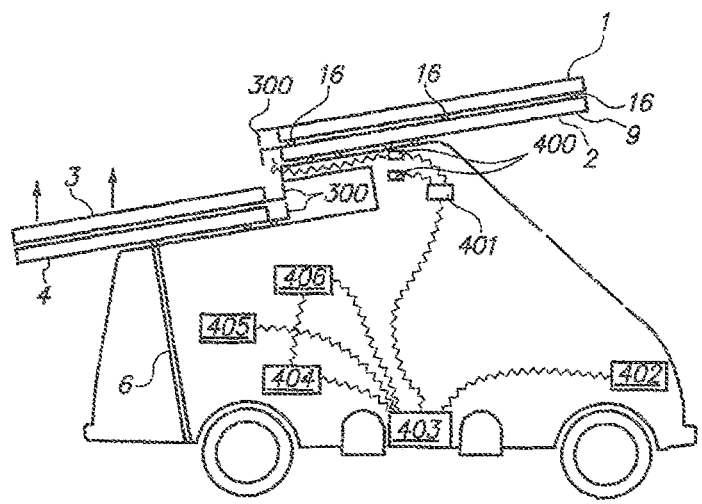

FIG. 5: Is a side view of the vehicle when the solar array is expanded and moving towards full deployment.

Figure 6:
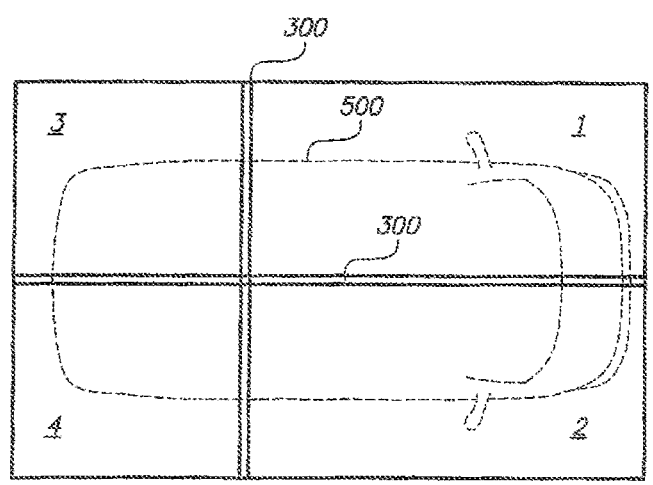

FIG. 6: Is a top view of the vehicle with all four solar panels in the expanded and fully deployed positions.

Figure 7:
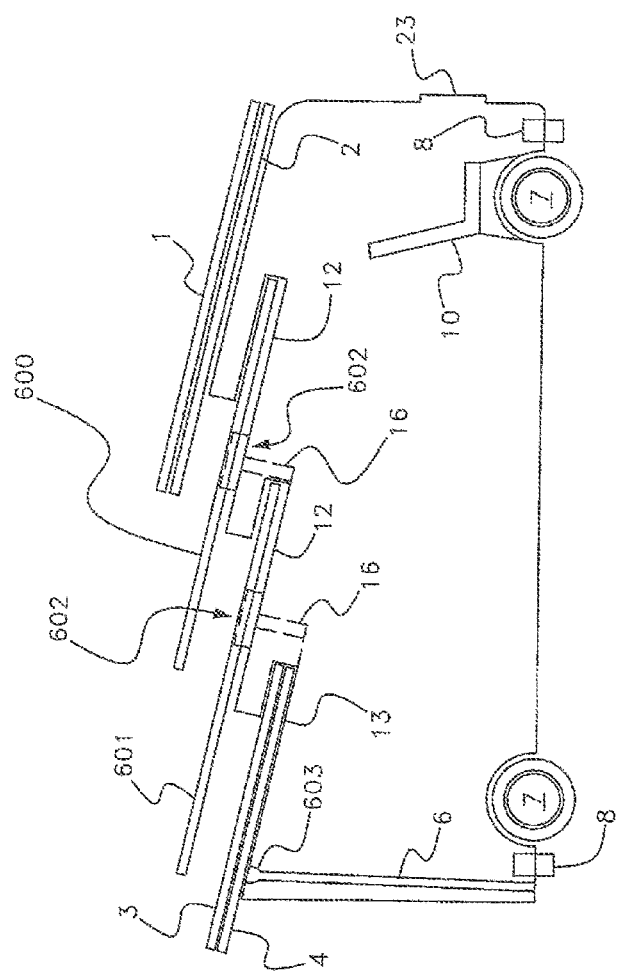
Figure 8:
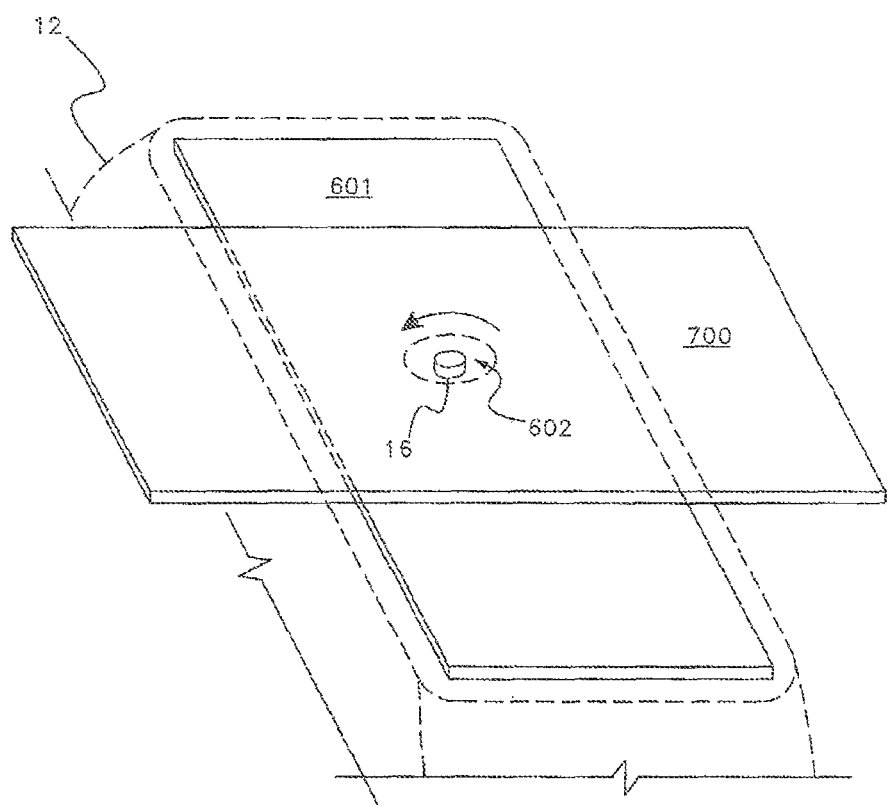
Figure 9:
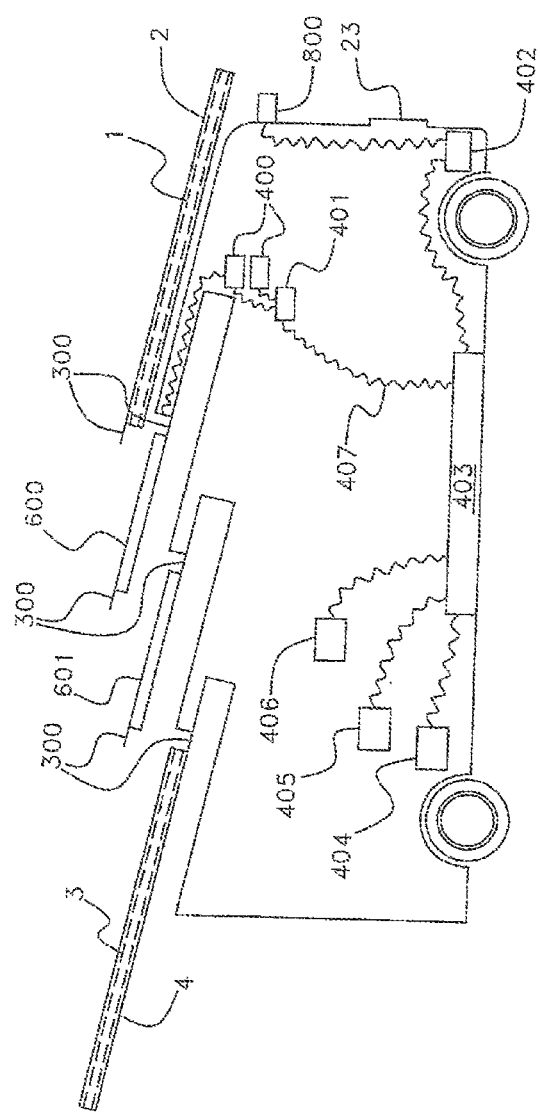
Figure 10:
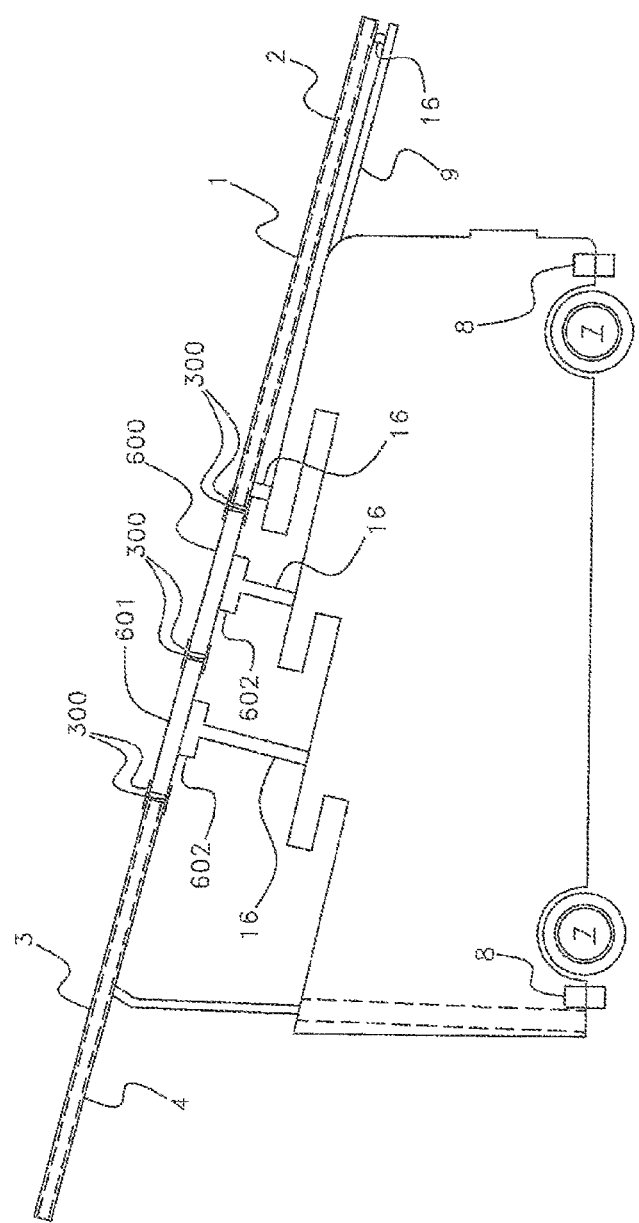

FIG. 7: Is a side view of a second embodiment of the vehicle with the solar panels undeployed FIG. 8: is a top view of the solar panels on the intermediate roof levels to show how they are deployed in embodiments of the vehicle which include swiveling solar panels FIG. 9 Is a side view of a second embodiment of the vehicle with the solar panels expanded but not raised to their final deployed position FIG. 10 Is a side view of the second embodiment of the vehicle after all the solar panels have been fully deployed.

Figure 11:
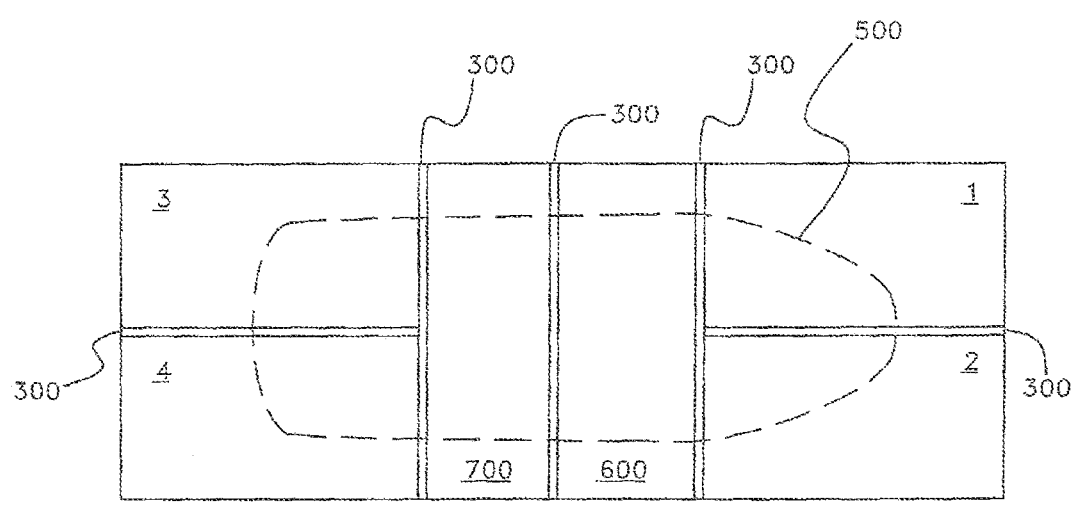

FIG. 11 Is a top view of the second embodiment of the vehicle after all the solar panels have been fully deployed.

Figure 12:
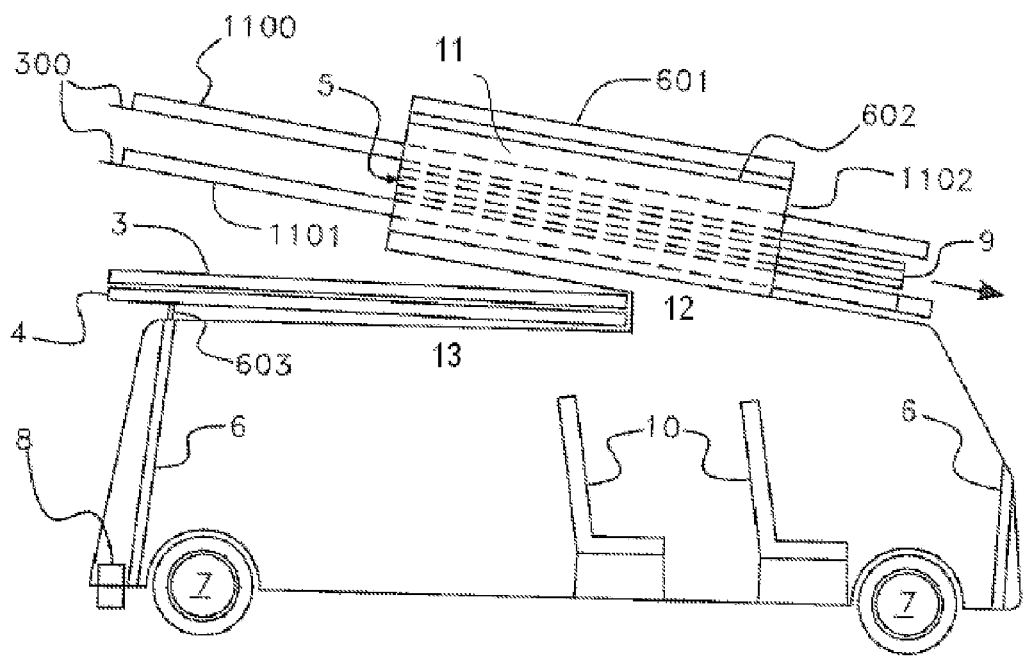
Figure 13:
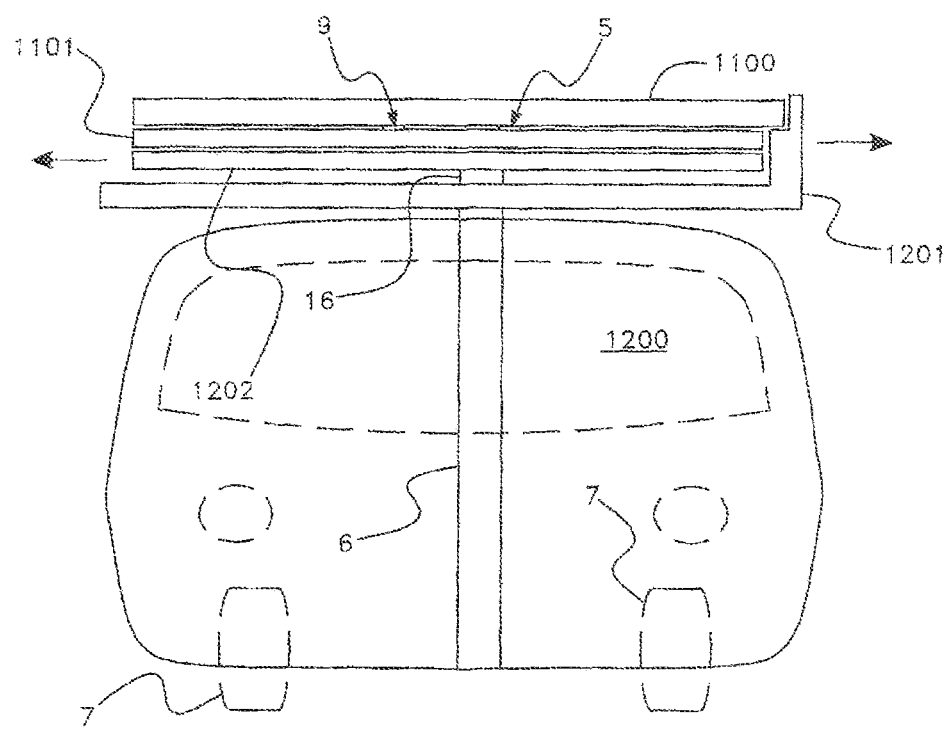
Figure 14:
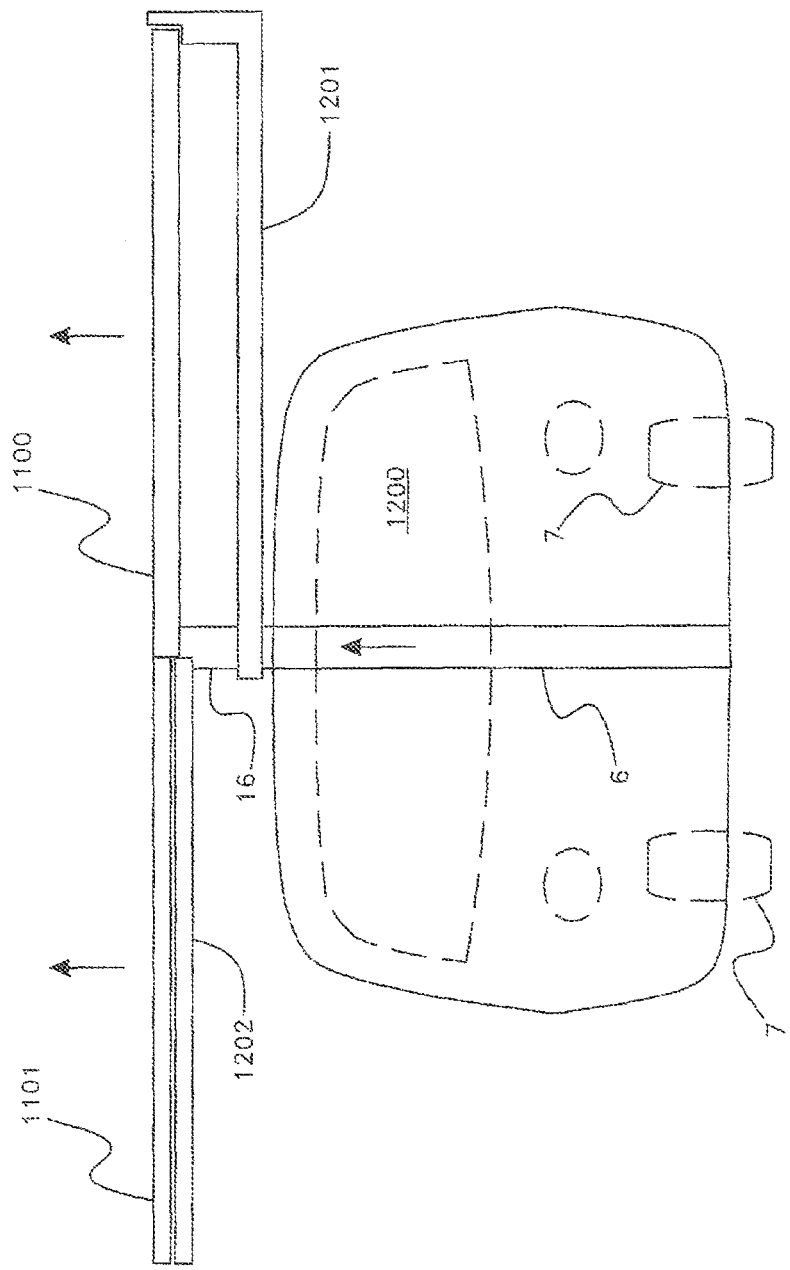
Figure 15:
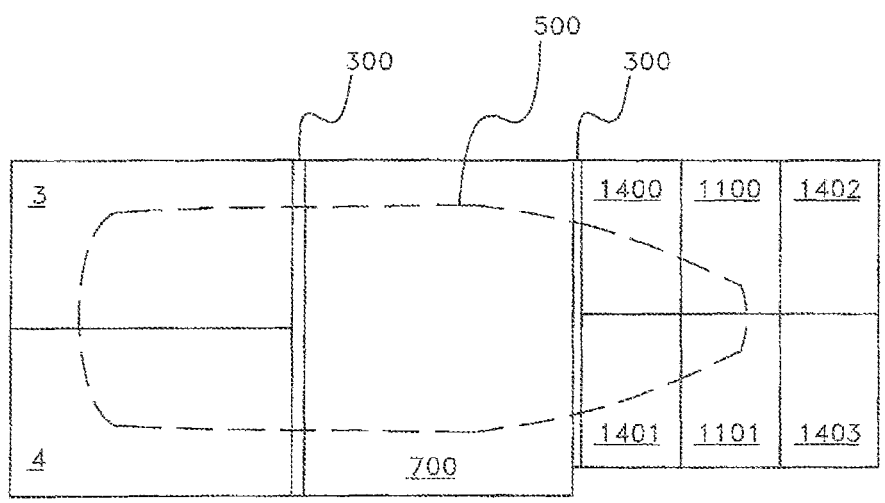
Figure 16:
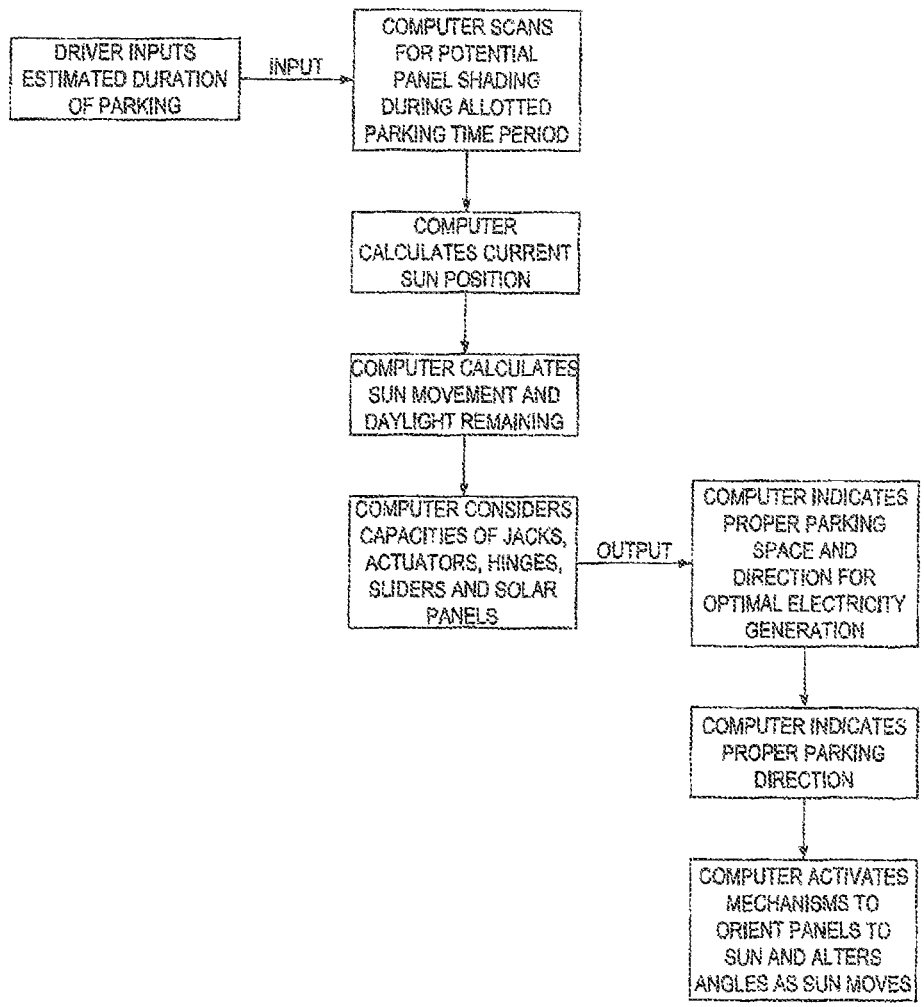
Figure 17:
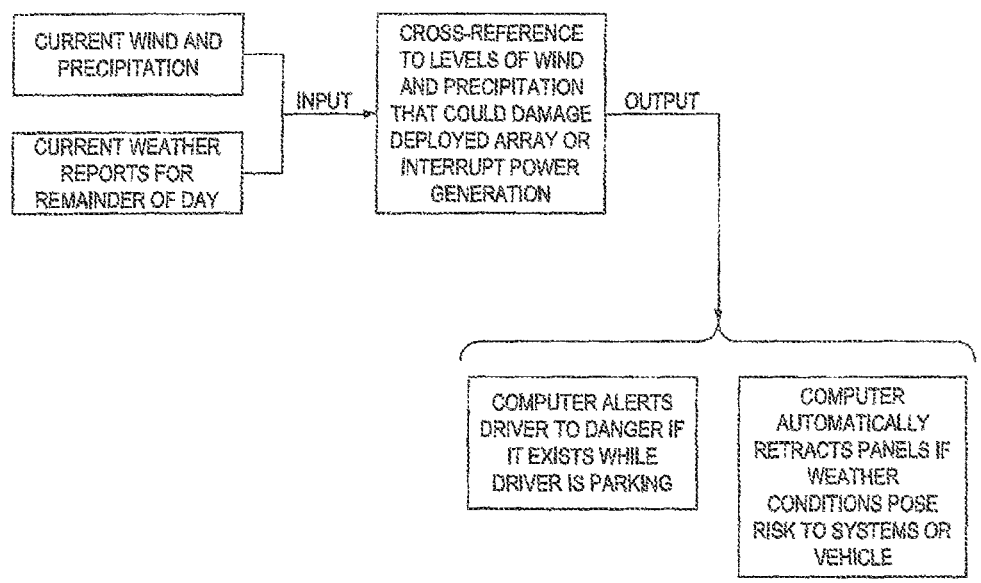
Figure 18:
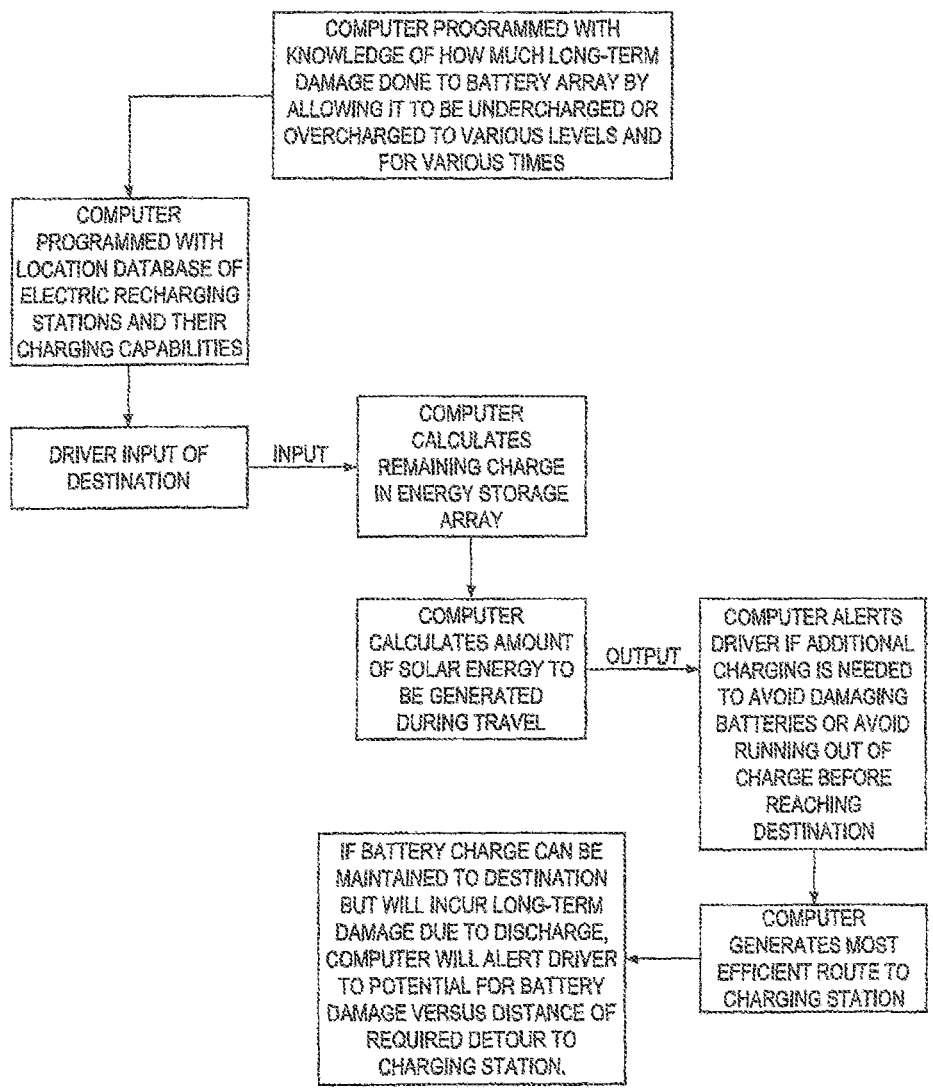

FIG. 12: is a side view of a third embodiment of the present invention with the solar panels in the undeployed position FIG. 13: Is a front view of a third embodiment of the present invention with the solar panels in the undeployed position FIG. 14: is a front view of a third embodiment of the present invention with the solar panels in the expanded position moving towards being fully deployed FIG. 15 is a top view of a third embodiment of the present invention with the solar panels in the fully deployed position FIG. 16: is a representation of how the onboard computer will help orient the solar array towards maximal electricity generation FIG. 17 is a representation of how the onboard computer will help driver protect the solar panels from extreme weather FIG. 18: is a representation of how the onboard computer will help driver maintain proper battery charge

LIST OF DRAWING REFERENCE NUMBERS 1 solar panel one
2 solar panel two
3 solar panel three
4 solar panel four
5 horizontal actuator
6 column
7 wheels/tires
8 jacks
9 telescoping slider
10 seats
11 highest roof level
12 intermediate roof levels
13 lowest roof level
15 clamping mechanisms
16 vertical actuators
17 rollers
18 the sun
23 windshield
24 oversized telescoping slider
25 stationary shelf
100 slit or channel in solar panel 2
101 support for stationary plate
200 connections between column and mechanical platform
201 supports for rear solar panels
300 framework extensions
400 circuits
401 solar charge controller
402 onboard computer
403 battery array
404 electric motor
405 electric port
406 motor controller
407 wiring
500 outside perimeter of vehicle
600 fifth solar panel
601 sixth solar panel
602 rotating actuator
603 tilt mechanism for column
700 deployed rotating solar panel
800 direct sensing devices
1100 higher solar panel set that moves forwards and then sideways
1101 lower solar panel set that moves forwards and then sideways
1102 support structure
1200 front of hood area of vehicle.
1201 moving and gripping platform
1202 moving platform
1400 solar panel
1401 solar panel
1402 solar panel
1403 solar panel

MORE DETAILED DESCRIPTION OF THE PRESENT INVENTION REFERENCING THE DRAWINGS

To illustrate some of its similarities with all vehicles, figure one shows the windshield 23, wheels and tires 7 and seats 10. However, figure one also shows how the roof has two levels higher than the heads of people sitting in either set of seats 10. Furthermore, the front roof level 11 overhangs the rear roof level 13. Not only does the overhang create a second roof surface under the overhang, but having a roof with two levels allows parts of two groups of sets of solar panels (group one being solar panel sets 1 and 2 while group two is solar panel set 3 and 4) to occupy the same area. To further increase the ability of one roof to hold more solar panels when they are in the undeployed position, shelves 25 exist over part of each roof level. In this way, each of two solar panel sets (1 and 3) can be primarily supported by one of the two stationary shelves 25, while each of the other two solar panel sets (2 and 4) can be supported by one of the two roof levels.

As we will see, the jacks 8 play an important role in helping orient the vehicle to the sun. But they are also useful to make it easier to change tires and make it possible to work under the vehicle without needing a lift or relying on comparatively unsafe free standing jacks. If you look carefully, there is one clamping mechanism 15 connected with each of the four solar panels. When the solar panels are subject to the aerodynamic forces associated with a vehicle moving at comparatively high speeds, these clamping mechanisms 15 grabbing onto some part of a solar panel will help prevent the solar panels from shaking, flying off or being damaged. But once the vehicle is parked and the solar panels are no longer subject to the aerodynamic forces of a vehicle travelling at high speeds, these clamping mechanism 15 can release the solar panels 1-4. This allows the solar panels 1-4 to be free to move from their undeployed to their deployed positions.

Just below solar panels 1-4 are rollers 17. They make it easier for the solar panels to move from one position to the other with minimal friction. Sticking out of the front corner just below solar panel 2 are horizontal actuators 5 and telescoping sliders 9. Although these items are not shown in figure one for the other three solar panels, all four solar panels use these two items as the main components to allow them to move obliquely from their undeployed to their deployed positions.

If one now looks at the same two items (5 and 9) in the top view of figure two, we can see how they work together to help solar panels 1 and 2 move obliquely (which has the effect of moving these two solar panels both forwards and sideways at the same time). Although solar panel 2 is only shown after it has been deployed to a position besides solar panel 1, we can see that solar panel 1 is shown occupying two positions, one atop the vehicle and the other partly in front of it and partly besides it. Solar panel 2 isn't shown in its undeployed position totally atop the vehicle because it is just below solar panel 1 occupying the same footprint. In other words, solar panel 1 and 2 are stacked up with solar panel 1 on top when they are both in the undeployed position.

It is because the end of solar panels 1 and 2 are affixed to the ends of the inner tubes of the horizontal actuators 5 that the movement of the linear actuators cause the solar panels to move the same distance and at the same angle as the moving inner tube of the horizontal actuators 5 move. There are double lines to represent the horizontal actuator in its undeployed position within the perimeter of solar panels 1 and 2. In that position, the inner tube is within the outer tube so the length of the linear actuator is about equal to the length of the outer tube. But the single set of dotted lines coming out of the original position of the horizontal actuator 5 represents the movement of the inner tube of the linear actuators. And as the inner tube of the linear actuator moves, so too does the solar panel to which it is attached.

The telescoping plate next to the linear actuator is itself pulled by the solar panels 1 and 2. Since solar panel 2 is lower than solar panel 1, it is raised by the vertical actuators 16 in figure two to the same level as solar panel 1. One number 16 straddles the line between the deployed solar panel 1 and the deployed solar panel 2. Half of this item is a vertical actuator and half is a permanent support for the shelf on which solar panel 1 sits.

Running at an angle of approximately 45 degrees from this item 16 to one of the two rear corners of the undeployed place where solar panels 1 and 2 are stacked up is a pair of dotted lines. Since it is needed to support the shelf where solar panel 1 sits, the half of item 16 which supports the shelf 25 must be there all the time. Hence, solar panel 2 (which sits just below solar panel 1 in the undeployed position) could never move unless it had a slit which exactly matched the part of solar panel 2 which would bang into this support/vertical actuator 16 as the solar panel 2 moved from its undeployed to its deployed position. Hence, the slit in solar panel 2 which we label 100 in figure two. Item 101 is, therefore, the back wall which helps the aforementioned vertical support labeled 16 to support the shelf upon which solar panel 1 sits.

At the back end of the vehicle in figures one, three and five is a column 6. Its purpose is to support the rear solar panels (3 and 4), the linear actuators 5, the telescoping sliders 9 and the support 201 for the rear solar panels 3 and 4. In figure three, you can see the column 6 and the pieces which connect it to the three supports 201 and to the solar panels 3 and 4.

The horizontal actuators 5 in figure four move solar panels 3 and 4 in the same way that solar panels 1 and 2 are moved by their horizontal actuators as described four paragraphs ago. Similarly, the telescoping sliders 9 shown n figure four are pulled by the moving solar panels 3 and 4 in the same way that the telescoping sliders 9 are pulled by solar panels 1 and 2. All four of these telescoping sliders 9 move alongside the four linear actuators 5 to help balance the four solar panels (1-4) they are just below. As we see, the oblique movement of all four solar panels is accomplished in the same basic way. However, it is the movement upward of column 6 which causes solar panels 3 and 4 to move upwards. Only solar panel 4 moves upward until it reaches the level of solar panel 3 as depicted in figure five. But once this has been accomplished, both of these solar panels move upwards together from there until their extreme front perimeters come within an inch of touching the next nearest solar panels. Just as the two solar panels coming upwards the furthest (3 and 4) have framework extensions 300 on their bottoms, the two solar panels they come upwards to meet (1 and 2) have framework extensions 300 on their tops. By looking at the top view of the solar array in figure six, we see that the framework extensions attached to solar panels 1 and 2 go over part of the top framework of solar panels 3 and 4. And if one looks at figure five, we see that similar framework extensions 300 come out of the bottom of solar panels 3 and 4. Because of how these framework extensions span the very small gap between the edges of the two sets of solar panels, we see that the combined effect of the top and bottom framework extensions 300 on the shorter side of the solar panels is to interlock panels 4 and 3 and to interlock solar panels 1 and 3. But of course, there are also similar top and bottom framework extension on the longer sides of the solar panels. These have the effect of interlocking solar panel 1 and 2 and of interlocking solar panels 3 and 4. In total, the effect of these eight framework extensions is to form one continuous group of solar panels once all the solar panels have moved upwards in addition to moving obliquely. This movement upwards is in accord with the two movement arrows just above solar panels 3 and 4 in figure five. Although figures seven through eleven depict a different embodiment of the present invention, one can look at figure ten to visualize the final resting place of solar panels 3 and 4 in their fully deployed position from a side view. The second embodiment (figures seven through eleven) includes two solar panels (5 and 6) which are not included in the first embodiment as depicted in figures one through six. However, the common denominator of all the solar panels lining up on the same tilting plane with each one interlocked because of their framework extensions 300 is the same for all three embodiments of the present invention (the third embodiment generally depicted in figures twelve through fifteen as we will discuss soon).

Since we have been focusing on solar panel movement, I would like to also note that the second embodiment (and a third embodiment which follows) of figures seven through fifteen include at least one swiveling (or rotating) solar panel(s). In both embodiments, the swiveling solar panels 600 and 601) occupy a deployed position between the front and rear solar panels. In general, the idea of swiveling solar panels in the middle and solar panels that move forwards or backwards in the front and back respectively will apply to any possible embodiment of the present invention.

How solar panels rotate ninety degrees (which could also be called swiveling) is shown best by looking at figures seven and eight. As we see in figure seven, there is a rotating actuator 602 just below solar panels 600 and 601. In figure eight we see a directional arrow pointing in a counterclockwise direction around this rotating actuator 602. Just as the movement of the horizontal actuators causes solar panels 1, 2, 3 and 4 to move in the same direction and the same distance as the actuator moves, so too does the movement of the rotating actuator 602 cause the solar panel to which it is attached to move. As this rotating actuator 602 turns in the counterclockwise direction depicted by the directional arrow, it moves the solar panel from the undeployed position 602 to the deployed position 700. By using what is below (roof line 12 in particular in figure eight and by seeing solar panel 602 in the context of the entire vehicle in figure seven), we see that the long side of the undeployed solar panel 602 is running parallel with the long side of the vehicle. On the other hand, figure eight makes it clear that the long side of the deployed solar panel 602

(labeled 700 in figure eight and also in one figure fifteen for the third embodiment) is running perpendicular to the long side of the vehicle and to the undeployed position of the same solar panel; labeled 602.

Returning to figure five (or figure ten which also includes the internal items which use the electricity produced primarily by the solar panels) we can see how the solar aspect of this system interacts with the other key parts which make this an electric vehicle rather than one with an internal combustion engine.

Since the wavy line labeled 407 is the internal wiring of the vehicle, we can start with circuits 400. We are starting with circuit 400 because it is the first place that the electricity generated by the solar panels travels to.

Because solar panel 1 is always generating electricity, it makes sense to use a more expensive higher efficiency solar panel in this position. To understand why I am suggesting this arrangement, it is useful to know that most high efficiency solar panels are set to deliver a higher voltage than the average solar panel. If the voltage of this solar panel 1 is set to be about equal to the combined voltage of the other three solar panels 2, 3 and 4, then each of the two circuits 400 will be dealing with electricity coming in at about the same voltage. This voltage level should be slightly higher than the voltage required to run the motor 404. In this way, the solar charge controller 401 will have an easier job regulating the voltage of the electricity it gets from the two circuits 400 to an even and slightly lower level for transfer to the battery array 403. This even and slightly lower level which is transferred into the battery array 403 will be the same voltage which the battery array 403 transfers to the motor 404 when needed to operate the vehicle. In practice, most electric vehicles will use another controller 406 as a sort of interface between the motor, battery array and the foot pedal that the driver uses to determine the speed of the vehicle. If the motor doesn't need electricity because the vehicle is not being driven, the solar electricity will be used to fully charge the battery array 403. When the battery array is fully charged, any solar electricity which is still being produced can be transferred through external electrical port 405 into any structure with a compatible electrical port located near where the vehicle is parked. If the battery array is not fully charged, electricity from a nearby structure can travel through electrical port 405 to help the solar panels charge the battery array 403.

With this in mind, let us consider the other function of electrical port 405. Besides sending out excess electricity as just described, it can be used to import electricity from a nearby structure or electrical generating or transfer facility to recharge the batteries 403 when needed.

Partly because the movement of the solar panels from the deployed to the expanded and then fully deployed positions is a somewhat complex operation, the present invention features an onboard computer 402 whose electricity also comes from the battery array 403. Not only does this onboard computer control the actual deployment and retraction of the solar panels when the driver has decided to deploy or retract the solar array, but this onboard computer 402 can sometimes retract the solar panels on its own. It will do this if the driver is otherwise occupied and the weather is about to get too windy or another extreme weather event is about to occur. As figure seventeen suggests, the computer will use weather reports and its own ability to feel how windy or rainy it is getting in the vicinity of the vehicle (all of the direct sensing devices of the onboard computer are shown as item 800) to decide whether it would be prudent to retract a deployed solar array to a less vulnerable undeployed position.

Based on being programmed to know all electric charging stations and on a GPS type knowledge of where places are, figure eighteen indicates how the onboard computer 402 will also help the driver find a nearby electric recharging station if this is necessary. To determine if it is necessary, the computer will consider how many driving miles of energy are left in the battery array and how much solar energy will be generated during a proposed drive to a particular destination. If the vehicle won't make it to the destination without making a detour to an electric charging station, then the computer will inform the driver of this fact. The computer will also compare the long-term damage done to the battery array if its charge goes below a predetermined percent versus the costs associated with making the shortest detour to an electric charging station to give the driver the information they need to decide whether it makes sense to make a detour even in cases where it is technically possible to make a proposed trip without making a detour. This is shown in figure eighteen.

Additionally, the onboard computer will help the driver choose the parking space available which will allow the solar array to generate the most electricity during the time when the driver wants to park it. Related to that function, the onboard computer 402 will point out which parking direction would maximize electricity generation. The vehicles' direct sensing device 800 will help give the onboard computer 402 the ability to follow the direction of the sun and get other information to help the computer pick the best possible parking space and parking direction. Furthermore, this knowledge and related preprogrammed knowledge will help the onboard computer 402 determine which of the jacks 8 should be used to raise one or more corners of the vehicle to better align the solar array towards the position that will maximize solar electricity generation. Figure sixteen illustrates how this might happen.

Just as the description of the last seven paragraphs relating to figure five applies to the first embodiment of the vehicle, these same items were labeled in figure ten to help us know that the same description of how these internal electrically related items (plus the outside sensing device 800) work applies to the second embodiment of the vehicle as well. And this description of the electrical system also relates to the third embodiment of the present invention which we will introduce in a few paragraphs.

In fact, the second embodiment of the vehicle shown in figures seven through eleven is essentially a longer version of the first embodiment. Because this type of embodiment would typically be a truck or bus, I made the direction of the roof layering and of the solar panel TILTING different. This is because a taller back and shorter front would probably work better for a truck (giving it a high cargo area) or a bus (giving it the ability for it to be a double decker bus in most of the areas behind the driver).

Figures twelve, thirteen, fourteen and fifteen generally illustrate what is different about a third embodiment. In figure twelve, we see that the solar panels 3 and 4 in the rear of this third embodiment are at a different angle than the other solar panels (1100, 1101 and 602). As is also true in regard to the second embodiment, there is a tilting mechanism 603. In terms of this third embodiment, the purpose of this tilting mechanism is to move solar panels 3 and 4 to the same plane as solar panels 601, 1100 and 1101 during the final stages towards deployment. Like the other pair of rear panels, the two back panels in this third embodiment are numbered 3 and 4 because they use one horizontal actuator per panel to move at an oblique angle from their undeployed to their deployed position and vice versa. Similarly, the very top panel 601 and its rotary actuator 602 are given the same numbers as other swiveling panels in the second embodiment because they move in the same way. But because rotating solar panel 601 is mounted above all other solar panels, a supporting structure 1103 is needed. The cross hatching represent the area of a covering plate that is on both sides of solar panels 1100 and 1101 in the area where this supporting structure for solar panel 601 exists. While these side supporting plates do not have slits, there have to be slits on the back panel of this structure to allow solar panels 1100 and 1101 to pass through. Nonetheless, there is also a cross piece connecting the two sides of structure 1103 at the level between solar panels 100 and 1101. Both a horizontal actuator 5 and a telescoping track 9 will be anchored from behind by being connected to this cross piece. Since they will be between solar panels 1100 and 1101, the front of the horizontal actuator 5 and telescoping track 9 will be attached to both solar panels near their front perimeter. When the vehicle is parked and it is decided to begin deploying the array, horizontal actuator 5 will move forward far enough to move both solar panels 1100 and 1101 to their final forward position. Telescoping track 9 will move alongside to create two points of balance for both solar panels 1100 (from below) and 1101 (from above). Once both solar panels 1100 and 1101 are in their forward position, figure thirteen shows how they will be connected to moving platforms 1201 and 1202. After column six comes out of the hood area 1200 to raise moving platform 1202 to the level needed to support solar panel 1101; most of which rests on top of it. At that point, horizontal actuator 5 and telescoping track 9 will give up their grip on solar panel 1101. Although I add the word "grip" to the name of the moving platform that holds up solar panel 1100, its position in the corner does not make it easy to get a fully secure grip no matter how well it is constructed. Therefore, horizontal actuator 5 and telescoping track 9 will still retain their grip on solar panel 1100 as solar panel 1101 is moved sideways to its final position (as indicated by the thicker arrow on the left side of figure thirteen and by the new positioning of solar panel 1101 as shown in figure fourteen). At that point, vertical actuator 16 at the top end of column 8 is raised to a level high enough to replace linear actuator 5 (first) and then telescoping track 9 as the left side support for solar panel 1100. As we see from the darker directional arrows in figure fourteen, the column will then raise both solar panels 1100 and 1101 (which are now on the same plane) to the same level as the originally higher rotating solar panel 601.

Once the back solar panels 3 and 4 are also raised to the same plane as illustrated by the directional arrows in figure five, all five solar panels of this third embodiment are on the same plane. As was true for figure six in regard to the first embodiment, one can look at figure ten to visualize how all the solar panels in each embodiment will be lined up on the same plane in their fully deployed position.

As was true for the final figure of the first and second embodiments (figures six and eleven respectively), the final figure of this embodiment (fifteen) best illustrates the main point of the present invention. It does this by showing how much larger the total solar array is versus the dotted line 500 which represents the outline of the vehicle. It is because the solar array is so much larger than the vehicle that it can produce enough electricity to play the primary role in powering the vehicle. At the same time, it is because the huge solar array created by all three embodiments forms a huge rectangle whose outside edges are only a few feet from the outside edges of the vehicle that it can be accommodated within most standard parking spaces and that the deployed solar array does not stick out so far that it creates a major danger for accidents with passing vehicles which are high enough to hit it.

Although the final figures of each embodiment are similar as noted above, there is one key aspect of the present invention which I only indicated in the last figure fifteen so as to avoid confusion when looking at the first fourteen figures. In that figure fifteen alone, I divide up solar panels 1100 and 1101 into three parts. If one superimposes those three parts over figure twelve, we see that 1400, 1401, 1402 and 1403 are the parts of solar panels 1100 and 1101 which are not covered by solar panel 601 in the undeployed position of figure twelve. This was done to illustrate that all solar panels which were partly covered in the undeployed position will be manufactured in a way that allows the parts of any solar panel which are always uncovered to generate electricity even while the vehicle is being driven and the array is undeployed. Doing this requires the solar panel manufacturer to follow a wiring schematic that separates the wiring system of the parts of the solar panels. The result will be that those panels which generate electricity in only the deployed position will be wired separately from the parts of the solar panels that generate electricity in both the deployed and undeployed positions.

I also would like to note that this third embodiment shows a jack 8 in the front position while the other two embodiments who jacks 8 in both a front and rear position. Additionally, each of these three embodiments would have the same number of jacks 8 on the opposite side of the vehicle. While having only two jacks (one on the front of each side of the vehicle) as per this third embodiment would not give the onboard computer 402 as many options to properly orient the deployed solar array towards the sun 18, it would be less expensive to build.

In addition to the four, five and six solar panel embodiments described, one could also create other embodiments of the present invention with three solar panels, six or more solar panels. One could also use different tilting patterns, different angles of inclination of the solar array or different numbers or types of vehicle roof overlaps. While there are also other common denominators of importance, the key common denominators of all possible embodiments is that they will have at least one roof overlap and that they have at least two solar panels being moved by one horizontal actuator at an oblique angle.

There is one more point I would like to make before closing this section. While figure three represents the rear part of the second embodiment as well as the first and third embodiment, it only fully applies to a bus version of the second embodiment or to a very long personal vehicle. The placement of the column 6 in the middle of the rear of the vehicle is probably not optimal for a big truck. In order to get a fork lift into the rear of the vehicle when it is parked at a loading dock, a big truck would probably move the column 6 to one of the two sides. This would not be particularly difficult and how to do it was not included in the drawings since it should be obvious to someone of average skill in the art. All that would be required is to shorten the connections between the column 6 and one of the two supports 201 and to lengthen the connections between the column 6 and the other two supports 201.

Although the terms and definitions used in the specification are intended to be read into the claims they are not intended to limit the meets and bounds of the claims presented here below in any manner whatsoever.

Those experienced in the field of this invention should, based on the detailed descriptions of the objectives and new methods, be able to understand the logical possible variations. They will be able to adopt appropriate strategies, dimensions and geometries depending on the various applications and needs of different engines, not specifically shown in this application, but within the general goals and objectives of this invention.

I claim:

1. A vehicle with a multi-level roof for supporting a deployable solar array, comprising:
   a) A means of electrical storage;
   b) A means of electrical locomotion;
   c) An axis in the direction that the vehicle travels in a straight line;
   d) an upper roof surface;
   e) one or more lower roof surfaces;
   an overlap of the upper roof surface over a minimum of approximately 5 percent of the area of at least one of the lower roof surfaces;
   g) one or more solar panels covering a minimum of approximately 10 percent of the upper roof surface and one or more solar panels covering at least 10 percent of at least one of the one or more lower roof surfaces when the deployable solar array is in an un-deployed position;
   h) an overlap of solar panels wherein a minimum of approximately one square foot of at least one solar panel above the uppermost roof surface overlaps the footprint—of at least one solar panel below the uppermost roof surface when the array is undeployed and a roof between them the overlapping panels and wherein the panels, when deployed, expose a larger area towards the source of solar energy than the roof of the vehicle and wherein said larger area occupies a substantially rectangular shape which conforms to a parking space.

2. The vehicle of claim 1, wherein:
   at least one of said solar panels lies above the highest level of said roof, a higher solar panel,
   at least one of said solar panels lies below the highest level of said roof, a lower solar panel,
   the size of said higher solar panel will be at least as large as the size of the highest level roof,
   the collective size of the at least one solar panel below the highest level roof will be at least as large as said highest level roof;
   and wherein, in the undeployed position, the highest solar panel, the highest roof level and the at least one lower level solar panel will be stacked up one on top of the other;
   and wherein at least eighty percent of each roof level and every solar panel mounted on the vehicle will be within the footprint of the vehicle and its lower level roof or roofs when the solar array is undeployed;
   and wherein, in the undeployed position, the part of the highest level solar panel above the highest level roof will be at least as large as the size of the highest level roof and wherein no more than twenty percent of the highest level roof will be ucovered, ween from above, by the highest level solar panel;
   and wherein, in the deployed position, the solar panels will be positioned such that at least eighty percent of every solar panel mounted on the vehicle will be exposed to the noonday sun.

3. The vehicle of claim 2, wherein:
   a) At least two of the solar panels mounted on the vehicle are moved by one separate actuator from the undeployed to the expanded position and wherein further, one or all of these two or more solar panels are moved either upwards or downwards by a vertically oriented actuator in the deployed configuration,
   the two solar panels on the top roof surface cover a roof surface and an area in front of the top roof surface equal to the area that they covered in the undeployed position over the lower set of solar panels, excluding the roof overlap area; and
   wherein said actuators together cause said lower set on the higher roof surface to move forwards, in an oblique movement such that these two solar panels in the deployed position sit next to each other and wherein further one of them covers the right half of the vehicle plus an equal area to the right side of the vehicle and which movement further results in the other solar panel in this set covering the left half of the front of the vehicle and an equally wide area to its left. and wherein said at least one upper or lower panel further comprises a slit adapted to permit full extension to the deployed position and wherein said vehicle further comprises a shelf over part of each roof level to support said solar panels when they are in the undeployed position,
   and wherein said solar panels are secured to the vehicle with clamping mechanisms during periods of vehicle travel.

4. The vehicle of claim 3, wherein:
   a) at least one of the upper solar panels or lower solar panels are moved from the un-deployed position to the expanded position along an essentially horizontal path that is oriented at an angle that is at least 10 degrees and no more than 80 degrees different from the axis;
   and wherein said solar panels further comprise horizontal actuators and telescoping sliders to allow them to move obliquely from their undeployed to their deployed positions.

5. The vehicle of claim 4, wherein:
   a) the elevation of one or more of the solar panels is altered by a vertical actuator.

6. The vehicle of claim 5, wherein:
   a), in the fully deployed position, at least three solar panels are on the same plane as each other.

7. The vehicle of claim 6, wherein:
   a) a rotary actuator rotates one or more solar panels 85-95 degrees to move from the un-deployed position to the deployed position and wherein, in this deployed position the long side of these one or more solar panels will be within five degrees of perpendicular to the long side of the vehicle.

8. The vehicle of claim 7, wherein:
   a) one or more vertical actuators or jacks elevate at least part of the deployable solar array or vehicle for increasing the capture of solar radiation.

9. The vehicle of claim 8, wherein a computer performs both of the following operations:
   i) determining whether the vehicle can make a trip suggested by the driver without running out of electricity or creating a danger of long-term damage to the batteries
   ii) If the computer determines that the driver's proposed trip could cause long-term damage to the battery array or if the vehicle will run out of electricity on the way, the computer will suggest the shortest detour whereby it is possible to stop at a battery charging station.

10. The vehicle of claim 9, wherein a computer performs both of the following operations
    i) suggest a parking spot and the direction to park to maximize solar electricity generation during a planned stay at a particular destination
    ii) use whatever tools are available to maximize solar electricity output while the vehicle is parked.

11. The vehicle of claim 10, wherein a computer monitor weather reports and use some source of direct knowledge of wind and precipitation to:
i) tell the driver if there is enough danger of damaging the solar array to make it inadvisable to deploy it when parking
ii) retract the solar array if the computer determines that the danger of damaging the solar array has increased to the point that it is inadvisable to keep it deployed while the vehicle is parked.

12. The vehicle of claim 11, wherein the position or elevation of one or more of the three or more solar panels is altered to move some or all of the panels to a position where at least one of the solar panels have framework extensions which overlap at least one of the other solar panels.

13. The vehicle of claim 12, wherein the electrical voltage required by the prime mover to operate will be no more than the total voltage of the solar panels that are exposed to sunlight whether in the deployed or undeployed position on a clear day at noon.

14. The vehicle of claim 13, wherein swiveling solar panels that rotate from eighty six to ninety five degrees will occupy the middle positions when deployed.

15. The vehicle of claim 14, wherein the average position of solar panels that move forwards and sideways will occupy the front position compared to other solar panels.

16. The vehicle of claim 15, wherein the average position of solar panels that move backwards and sideways will occupy a position behind other solar panels.

17. The vehicle of claim 16 wherein in the fully deployed position, all the solar panels will line up on the same tilting plane with each one interlocked because of their framework extensions.

18. The vehicle of claim 16 wherein substantially those areal parts of any solar panel which are upwardly exposed even while in the undeployed configuration are electrically connected so as to generate and store electricity even while the vehicle is being driven and the array is in said undeployed configuration.

19. An obliquely deploying vertically-stacked panel array assembly for a bearing roof of a vehicle having electrical propulsion comprising
sliding means adapted to convey at least two of said panels diagonally away from a center
point said roof and resulting in a side-to-side deployed configuration meeting substantially above the centerline parallel to the vehicle's habitual travel direction; and wherein
the panels, when deployed, expose a larger area towards the source of solar energy than the roof of the vehicle
the deployed width of said panel assembly exceeds the roof width
said larger area occupies a substantially rectangular shape which conforms to a parking space.

20. The assembly of claim 19 wherein further said sliding means comprise horizontal actuators and telescoping sliders to allow the panels to move obliquely from their undeployed to their deployed positions.

21. The assembly of claim 20 further comprising deployment rollers interposing between said panels and said roof.

22. The assembly of claim 20 wherein further each said horizontal actuator further comprises an inner tube and an outer tube.

* * * * *